United States Patent
Lynum et al.

(10) Patent No.: US 6,773,689 B1
(45) Date of Patent: Aug. 10, 2004

(54) CARBON MEDIA FOR STORAGE OF HYDROGEN

(75) Inventors: Steinar Lynum, Oslo (NO); Jan Hugdahl, Trondheim (NO); Ketil Hox, Trondheim (NO); Ragne Hildrum, Oslo (NO)

(73) Assignee: Kvaerner Technology Research Ltd., London (GB)

( * ) Notice: Subject to any disclaimer, the term of this patent is extended or adjusted under 35 U.S.C. 154(b) by 0 days.

(21) Appl. No.: 09/762,211
(22) PCT Filed: Sep. 17, 1999
(86) PCT No.: PCT/NO99/00287
 § 371 (c)(1),
 (2), (4) Date: Mar. 29, 2001
(87) PCT Pub. No.: WO00/18682
 PCT Pub. Date: Apr. 6, 2000

(30) Foreign Application Priority Data

Sep. 25, 1998 (NO) ................................................. 984497

(51) Int. Cl.[7] .............................................. C01B 31/04
(52) U.S. Cl. .................................. 423/448; 423/445 B
(58) Field of Search .......................... 423/448, 445 R, 423/445 B, 444.1, 444.2, 460

(56) References Cited

U.S. PATENT DOCUMENTS

| | | | | |
|---|---|---|---|---|
| 5,316,636 A | * | 5/1994 | Bunshah et al. | 204/157.47 |
| 5,543,378 A | * | 8/1996 | Wang | 502/174 |
| 5,653,951 A | | 8/1997 | Rodriguez | |
| 5,985,232 A | * | 11/1999 | Howard et al. | 423/447.3 |
| 6,077,401 A | * | 6/2000 | Fields et al. | 204/157.47 |

FOREIGN PATENT DOCUMENTS

| | | |
|---|---|---|
| EP | 0 682 561 | 11/1995 |
| EP | 0 636 162 | 11/1996 |
| EP | 8 229 920 AB | 3/1998 |
| EP | 8 229 920 | 3/1998 |
| FR | 2 701 267 A | 8/1994 |
| FR | 2 701 267 | 8/1994 |
| JP | XP-000783873 | 3/1997 |
| JP | XP-000783873 PB | 3/1997 |
| JP | XP-002125726 PB | 7/1997 |
| JP | XP-002125726 | 7/1997 |
| WOWO | PCT/NO93/00056 A | 10/1993 |
| WO | PCT/NO93/00056 | 10/1993 |
| WO | PCT/US96/06192 | 7/1997 |
| WOWO | PCT/US96/06192 A | 7/1997 |
| WO | PCT/US97/07366 | 11/1997 |
| WOWO | PCT/US97/07366 A | 11/1997 |
| WOWO | PCT/NO98/00093 A | 10/1998 |
| WO | PCT/NO98/00093 | 10/1998 |

OTHER PUBLICATIONS

Tarasov, Hydrogenation of Fullerenes C60 and C70 In The Presence ect., Elsevier, 1997, no month.
Haufler, Carbon Arc Generation of C60, Materials Research Society, 1991, no month.
Endo, Formation of Carbon Nanofibers, American Chemical Society, 1992, no month.
Hirsch, The Chemistry of the Fullerenes, Georg Thieme Verlag Stuttgart, 1994, no month.
Hoffman, Boston Team Claims Development ect. Hydrogen & Fuel Cell Letter, 1997, no month.
Vincent, Three–Dimensional Morphology ect. Inst. Phys. Conf. Ser. No. 138 Section 2, 1993, no month.
Li, Atomic Forces Microscopy of Carbon ect., Materials Research Society, 1995, no month.
Ebbesen, Carbon Nanotubes, Physics Today, 1996, no month.
Ge, Observation of Fullerene Cones, Chemical Physics Letters, 1994, no month.
Huffman, Solid C60, Physics Today, 1991, no month.

* cited by examiner

*Primary Examiner*—Stanley S. Silverman
*Assistant Examiner*—Edward M. Johnson
(74) *Attorney, Agent, or Firm*—W. Warren Taltavull; Manelli Denison & Selter PLLC

(57) ABSTRACT

This invention relates to a carbon media for storage of hydrogen characterized in that it comprises known and novel micro-domain materials and that it is produced by a one or two-step plasma process. In the one-step plasma process conventional carbon black or graphitic carbon black can be formed. In the two-step plasma process, a hydrocarbon feed material is sent through a plasma zone and becomes partly dehydrogenated in the first step to form polycyclic aromatic hydrocarbons (PAHs), and is then sent through second plasma zone to become completely dehydrogenated to form micro-domain graphitic materials in the second step. By micro-domain graphitic materials we mean fullerenes, carbon nanotubes, open conical carbon structures (also named micro-cones), flat graphitic sheets, or a mixture of two or all of these. The novel carbon material is open carbon micro-cones with total disclination degrees 60° and/or 120°, corresponding to cone angles of respectively 112.9° and/or 83.6°.

5 Claims, 8 Drawing Sheets

CARBON MEDIA FOR STORAGE OF HYDROGEN

FIELD OF INVENTION

This invention relates to a carbon media for storage of hydrogen.

BACKGROUND OF THE INVENTION

There is currently an intense interest in carbon materials due to their unique and novel properties. For instance, the carbon materials may be useful to achieve high hydrogen energy storage, for use in purification processes as well as for different applications within the electronical/pharmaceutical sector. The properties are sensitive to the micro-structure of the carbon material, which can be varied by the nanostructure ordering (graphitisation level). The nanostructure ordering spans from non-crystalline qualities such as conventional carbon black (furnace black, thermal black) to crystalline qualities such as graphite and novel carbon materials with graphitic structures. The nanostructure ordering can be described in terms of the distance between the graphite layers, which will vary from 3.40 Å for a ordered crystalline structure to 3.60 Å for non-crystalline materials.

The recent interest in carbon materials for use as a storage medium has mainly been focused on novel materials with graphitic structures where the degree of graphitisation and the introduction of rings other than hexagons in the network is of vital importance. Fullerenes are examples of novel graphitic structures where the introduction of 12 pentagons in the hexagonal network results in closed shells [1]. Carbon nanotubes is also an example of such graphitic structures, but only three of five possible kinds have ever been synthesised [3, 4, 5].

Recent interest in fullerenes and nanotubes is amongst other connected to their use in the field of hydrogen storage. Hence, for nanotubes a hydrogen storage of amazingly 75 wt % is reported [6]. If this is the case, it will probably represent the break-through concerning a practical hydrogen storage system for use in the transportation sector. It is indicated that future fuel cell cars using this storage technology may achieve a range of about 8000 km.

In the case of fullerenes, more than 7 wt % of reversibly added hydrogen is achieved [7, 8, 9]. Fullerenes has also been used in a solid phase mixture with inter-metallic compounds or metals to achieve high contents of hydrogen, i.e. 24–26 H atoms per fullerene molecule [10].

Flat graphitic material formed of stacks of two-dimensional sheets has high surface area for adsorption of guest elements and compounds. However, in such materials the adsorption process is probably limited by diffusion. The larger the graphitic domain, the slower the adsorption will be. Of potential interest would be highly graphitised materials where domains are small so is that the guest material would readily reach all the graphitic micro domains by percolation through the bulk carbon material. The accessibility to the micro-domains could be further enhanced if some or all the domains had topological disclination, preferably each domain having less or equal than 300° disclination to provide cavities, or micro-pores, for the flow of guest material.

A common problem with the present methods for synthesizing these graphitic materials is the low production yield. The fullerenes are most often synthesized by [vaporising] vaporizing graphite electrodes via carbon-arc discharges in a reduced inert gas atmosphere. There has been reported a conversion rate into fullerenes of 10–15%, corresponding to a generation rate of nearly 10 grams per hour [11].

The carbon-arc method is also the most frequently used method for production of carbon nanotubes. Nanotubes yields of about 60% of the core material has been obtained at optimal conditions [2]. Still, the achieved production is in gram quantities.

Small unspecified amounts of open conical carbon structures are obtained by resistively heating a carbon foil and further condensing the carbon vapour on a highly-oriented pyrolytic graphite surface [3, 4]. The cone angles produced by this method was approximately 19° [3], and 19° as well as 60° [4].

Resistive heating of a carbon rod, with further deposition on cooler surfaces was used to produce cones with apparent cone angles of approximately 39° [5]. It can be shown from a continuous sheet of graphite that only five types of cones can be assembled, where each domain is uniquely defined by its topological disclination TD given by the general formula:

$$TD = N \times 60 \text{ degrees, where } N=0, 1, 2, 3, 4 \text{ or } 5,$$

The structure of such graphitic domains can be grossly described as stacks of graphitic sheets with flat (N=0) or conical structures (N=1 to 5). Hence, two of these, holding cone angles of 83.6° and 112.9°, has not been reported so far.

SUMMARY OF THE INVENTION

An object of this invention is to provide a carbon media for storage of hydrogen. This object is achieved by a media characterised in that it comprises known and novel crystalline or non-crystalline materials and that it is produced by a two-step plasma process. By changing the process parameters of the plasma process, the nanostructure ordering of the carbon material can be varied in such a way that the desired microstructure for optimum hydrogen storage is achieved. These microstructures may either be conventional carbon black graphitic carbon black and/or novel carbon materials such as cones, fullerenes or nanotubes.

In the one-step plasma process conventional carbon black or graphitic carbon black can be formed. A such process is described in for instance EP 0 636 162. The resulting carbon material may have a surface area (BET) of 5–250m$^2$/g and a dibutyl phtalate absorption (DBP) of 40–175 ml/ 100 g.

In the two-step plasma process, a hydrocarbon feed material is sent through a plasma zone and becomes partly dehydrogenated in the first step to form polycyclic aromatic hydrocarbons (PAHs), and is then sent through second plasma zone to become completely dehydrogenated to form micro-domain graphitic materials in the second step. By micro-domain graphitic materials we mean fullerenes, carbon nanotubes, open conical carbon structures (also named micro-cones), Pat graphitic sheets, or a mixture of two or all of these. The novel part of the carbon material is open carbon micro-cones with total disclination degrees 60° and/or 120°, corresponding to cone angles of respectively 112.9° and/or 83.6°.

Another object of this invention is to provide a carbon media for storage of hydrogen comprising known and novel micro-domain materials, characterised in that the media is produced in industrial scale with large yield rates of up to above 90% by a one or two-step plasma process.

The invention also relates to use of the carbon media as a storage media for hydrogen.

DETAILED DESCRIPTION OF THE INVENTION

The hydrogen storage capacity of the media is linked to the small size of the domains and the presence of various topographies in the material. These are useful for the incorporation of guest elements and compounds such as hydrogen. Also, the space between the domains will provide micro-pores for the flow of guest material so that it can reach each domain and the small size of the domains will allow rapid diffusion of guest material in and out of each layer composing them.

The carbon media for storage of hydrogen in the present invention consists of known and novel micro-domain materials, such as conventional carbon black, fullerenes, carbon nanotubes, open conical carbon structures (also named micro-cones), or flat graphitic sheets alone, or a mixture of two or all of these. The amount present of any of the carbon structures, conventional carbon black, fullerenes, carbon nanotubes, micro-cones or flat graphitic sheets, in the media can be anywhere between 0 and 100 wt % based on the total mass of the hydrogen storage media. Further, all possible mixtures of these structures can be present.

Figure 3:
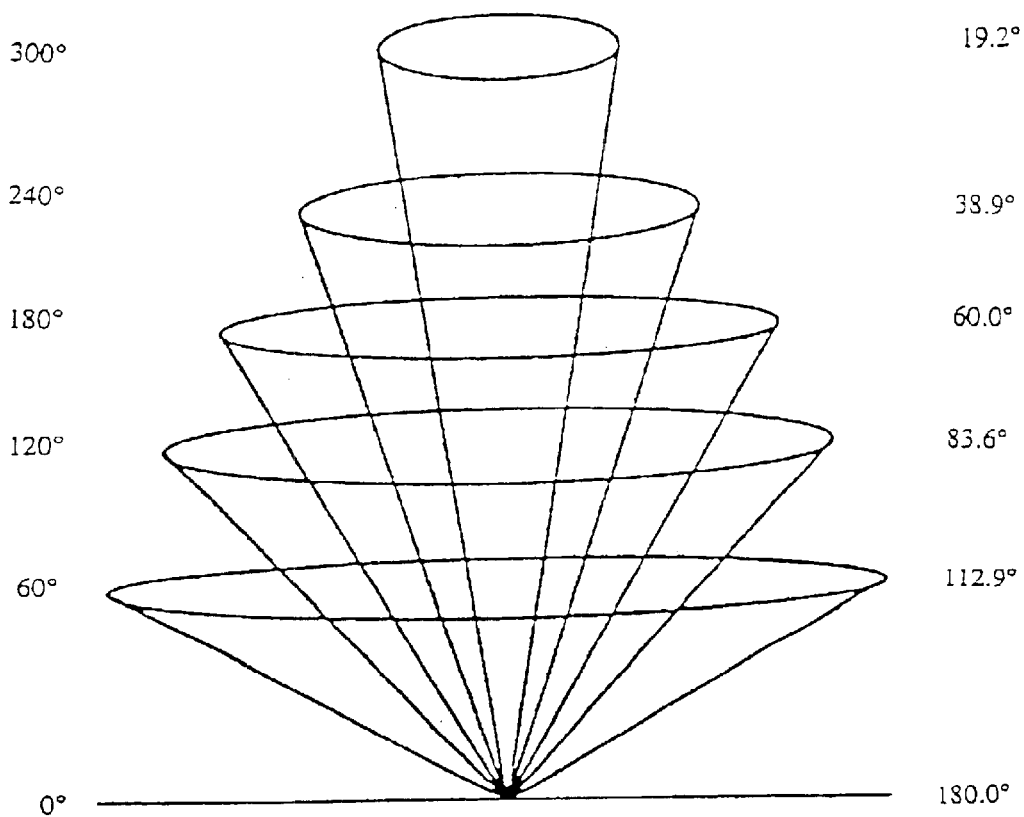
FIG. 3 shows the projected angles for perfect graphitic cones, i.e. 19.2°, 38.9°, 60°, 83.6° and 112.9°, which represents total disclination of 300°, 240°, 180°, 120° and 60°, respectively. In addition a graphitic sheet, having a projected angle of 180° and a total disclination of 0°, is shown.
Figure 4A:
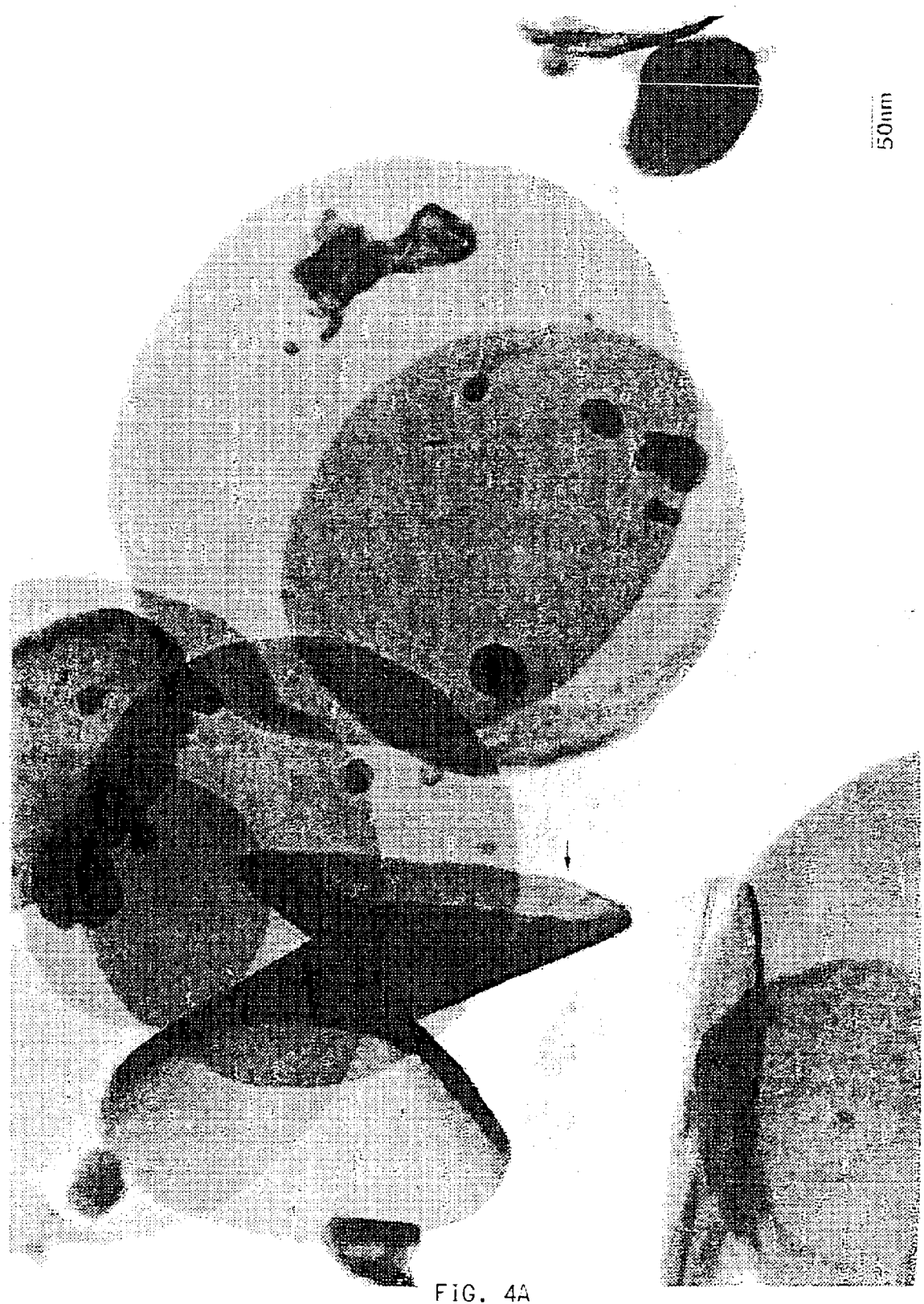
FIGS. 4A, 4B, 4C, 4D and 4E shows example of domains for each type of disclination 60°, 120°, 180°, 240° and 300°, respectively, present in the invention.
Figure 4B:
Figure 4C:
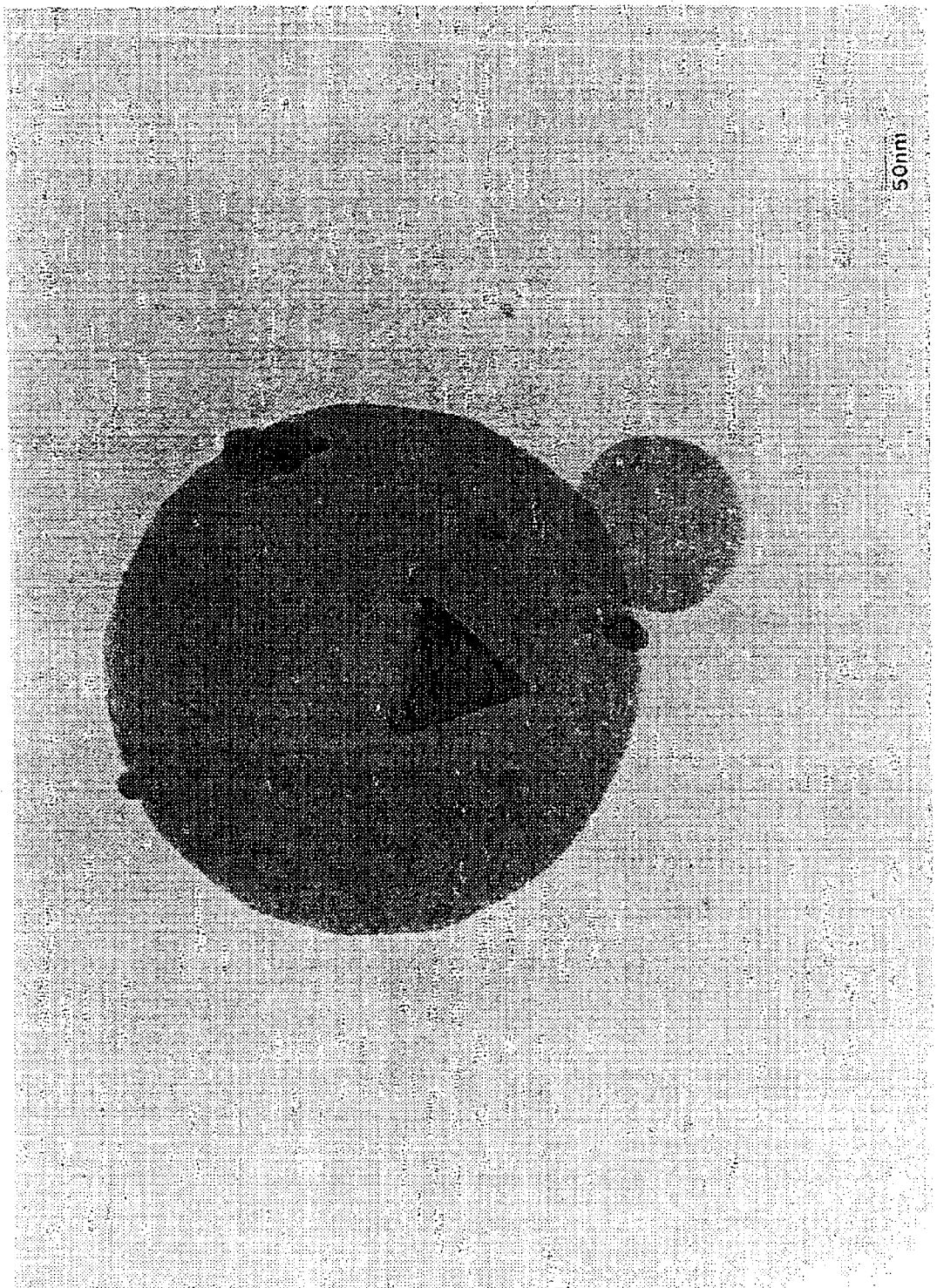
Figure 4D:
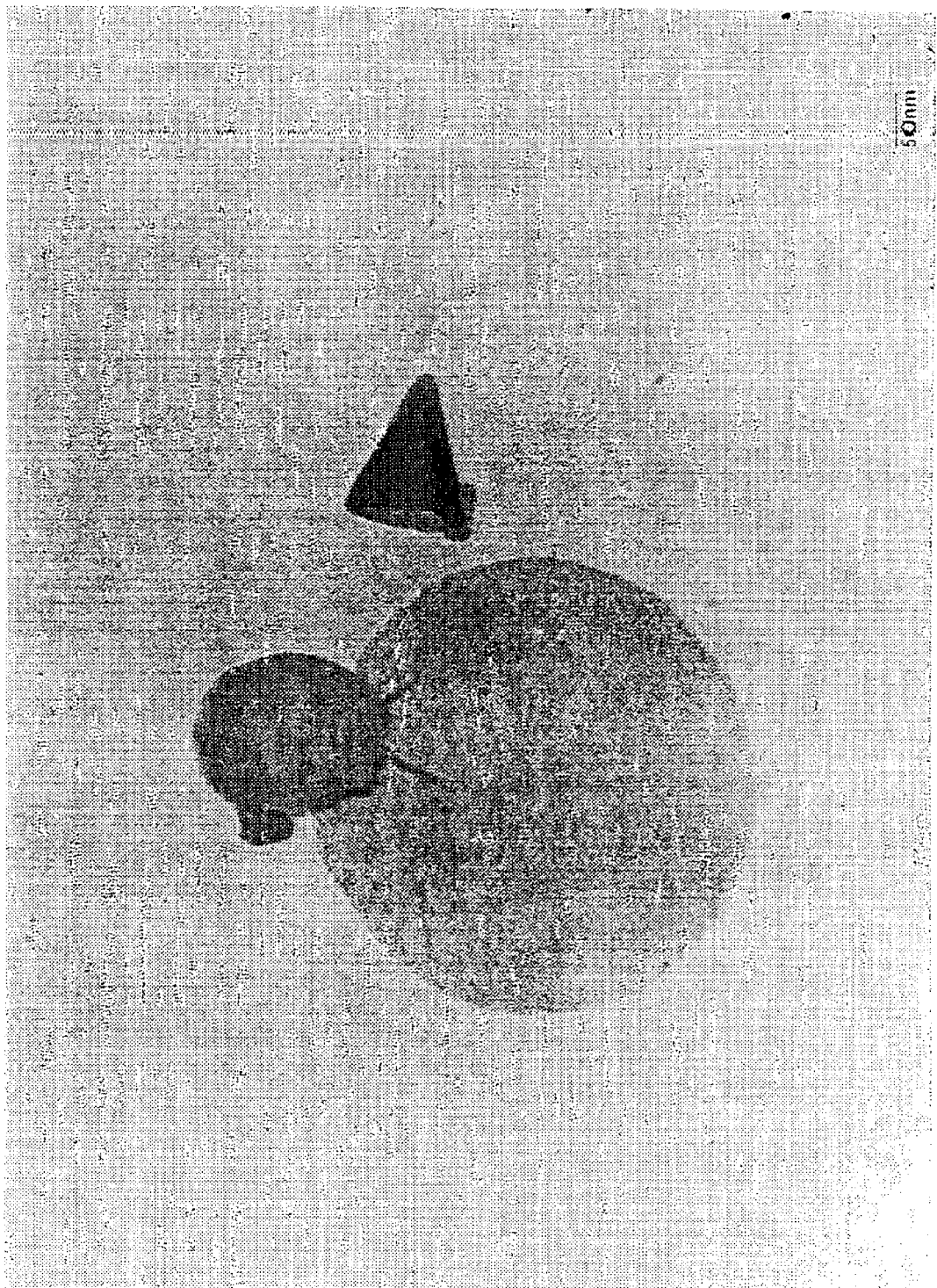
Figure 4E:
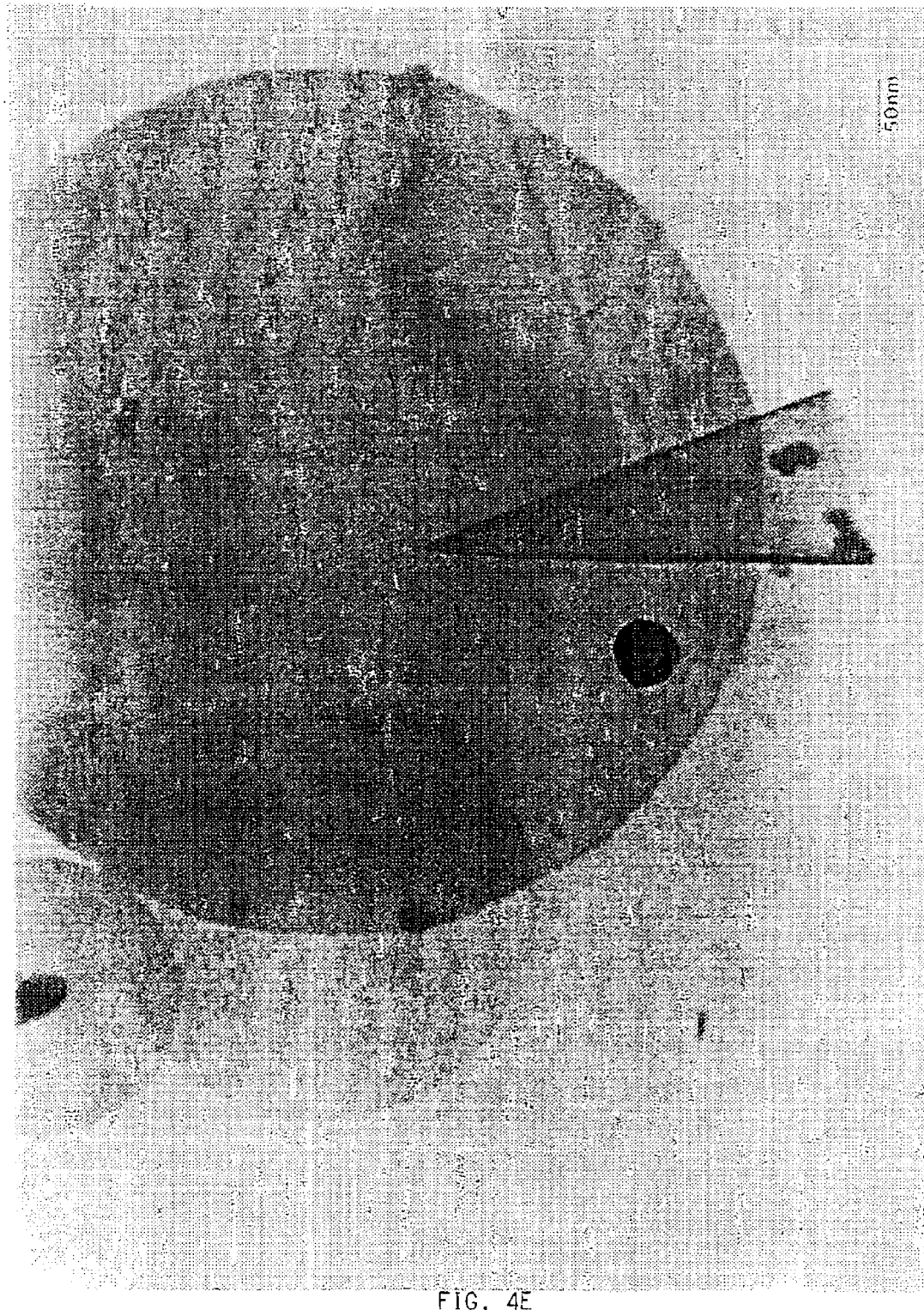

The novel carbon material is open carbon micro-cones with total disclination degrees 60° and/or 120°, corresponding to cone angles of respectively 112.9° and/or 83.6°. It can be shown that if a cone is made up of an uninterrupted sheet of graphite, except at the open edge, only five types are possible due to the symmetry of graphite. These corresponds to a total disclination of 60°, 120°, 180°, 240° and 300°. A total disclination of 0° corresponds to a flat domain. FIG. 3 shows schematically the projected angles of these structures. Examples of each of these types of domains are shown in FIGS. 4A, 4B, 4C, 4D and 4E. It is important to notice that all the cones are closed in the apex. The novel carbon material of this invention comprises micro-domains of graphite of well-defined total disclinations TD (curvature), which have discrete values given by the formula $TD=N \times 60$ degrees, where $N=0, 1, 2, 3, 4$ or $5$, and corresponds to the effective number of pentagons necessary to produce the particular total disclination.

The hydrogen storage media is produced in industrial scale by decomposition of hydrocarbons into carbon and hydrogen in a one or two-step plasma based process. The plasma arc is formed in a plasma generator which consists of tubular electrodes, wherein the inner electrode is supplied with electrical direct voltage with one polarity and wherein the external electrode is connected to the opposite polarity from a power supply. The plasma generator is installed in connection with a decomposition reactor wherein the reactor is designed as a defined heat insulated chamber with an outlet for end products. The plasma gas is recycled from the process. Further description of the general process and the equipment is described in the applicant's European patent EP 0 636 162.

The structure of the resulting carbon material will depend on the following three process parameters: The hydrocarbon feed rate, the plasma gas enthalpy and the residence time. By varying these parameters the resulting carbon material will either be available as conventional carbon black, as micro-domain materials or a mixture of both. In the following we will describe the process parameters for optimising on micro-domain materials. This illustrates the capability of the process to produce the carbon material which is most suited as a storage media for hydrogen.

Experimental results indicates that the total disclination nearly always is determined in the nucleation stage. It is earlier found that the probability of forming pentagons in the seed depends on the temperature [12]. Hence, by varying the process parameters, including but not limited to increasing the reaction temperature, the number of pentagons in the seed may increase. This may in turn result in formation on nanotubes or closed shells.

The hydrocarbons are introduced into the decomposition reactor in the vicinity of the plasma arc zone by use of a self-invented nozzle which is aligning the hydrocarbon spray in the axial direction of the reactor.

Energy is supplied from the plasma arc to heat the plasma gas. Some of the energy from the arc will be used to heat the surrounding reactor walls as well as the plasma generator itself. The resulting energy content of the plasma gas (the plasma gas enthalpy) is sufficient to evaporate the hydrocarbons. The hydrocarbons starts a cracking and polymerisation process, which results in the formation of PAHs. The PAHs are the basis of graphitic sheets forming the micro-domains. The plasma gas enthalpy is kept at such a level that the main fraction of the gaseous hydrocarbons does not reach pyrolysis temperatures at the specified feedstock rate and residence time used. However, a small fraction of the feedstock will inevitably achieve sufficient energy during the residence time in the reactor to reach pyrolysis temperature and is consequently converted to conventional carbon black. This fraction should be kept as low as possible.

The PAHs leaves the reactor along with the plasma gas and is once more introduced in the reactor as a part of the plasma gas. The plasma gas enters the energy intensive plasma arc zone, wherein the PAHs during a fraction of a second are converted to graphitic seeds. These seeds are dictating the shape of the micro-domains. PAHs formed when introducing fresh feedstock will result in growth of the seeds to form graphitic micro-domains.

Another alternative is to introduce the PAH containing plasma gas in a subsequent chamber or reactor which also is equipped with a plasma generator and an inlet for hydrocarbon feedstock to convert the PAHs into graphitic micro-domains.

The feedstock feed rate for optimising on graphitic micro-domain materials is in the range of 50–150 kg/h in a reactor employed by the inventor, but is not limited by this range. Both lower and higher feedstock feed rates might be used. The yield of the graphitic micro-domain material is higher than 90% under optimal conditions. Taken into account the feedstock feed rate utilised, industrial amounts of micro-domain carbon material is achieved. By further up-scaling this will result in a price which is on the same level as commercial carbon black per unit weight of the material.

Figure 1:
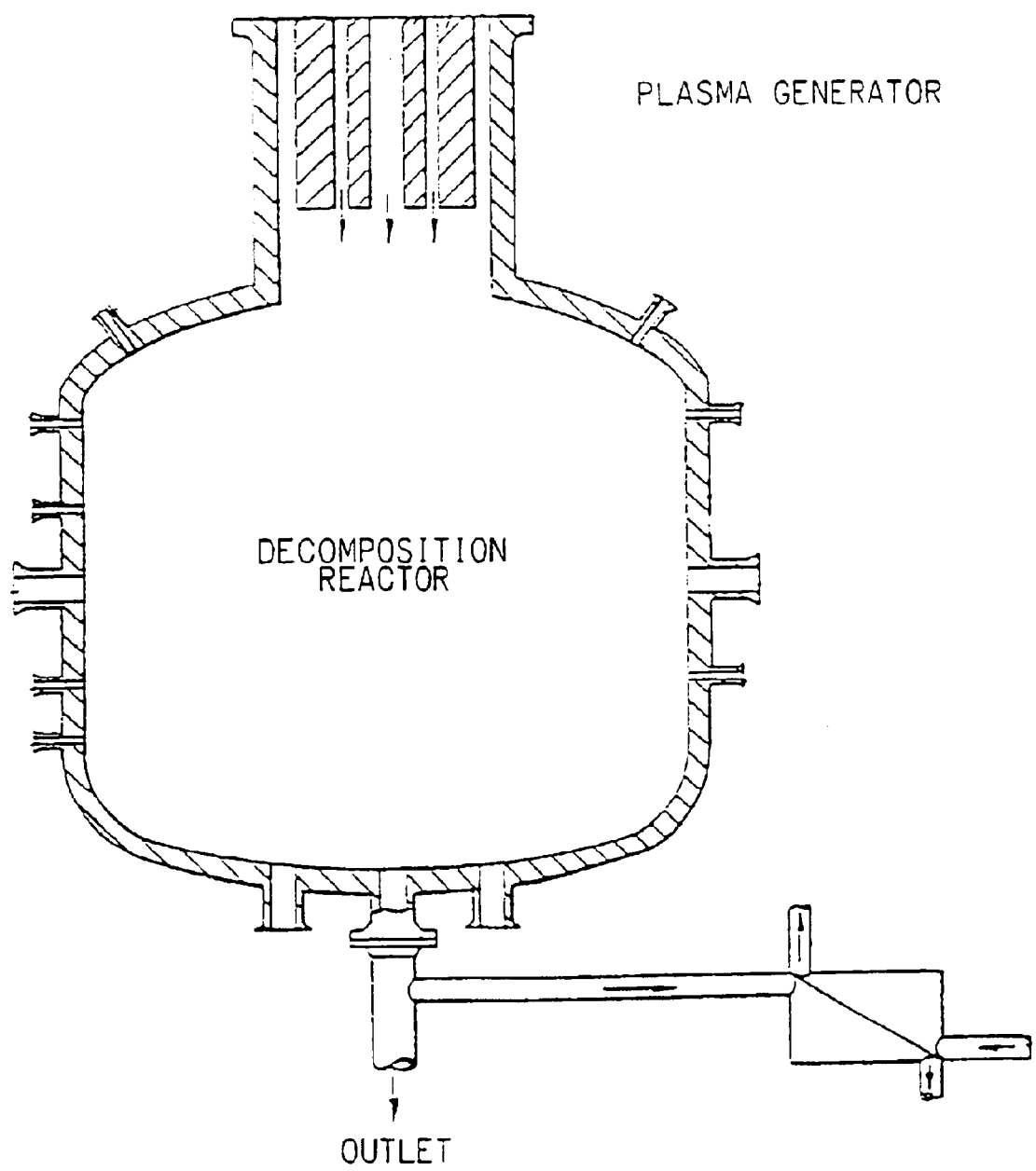
FIG. 1 shows a schematic figure of the reactor and the surrounding equipment.

FIG. 1 shows a schematic drawing of the reactor. Further details concerning the reactor and the surrounding equipment is described in the applicant's European patent EP 0 636 162.

Figure 2:
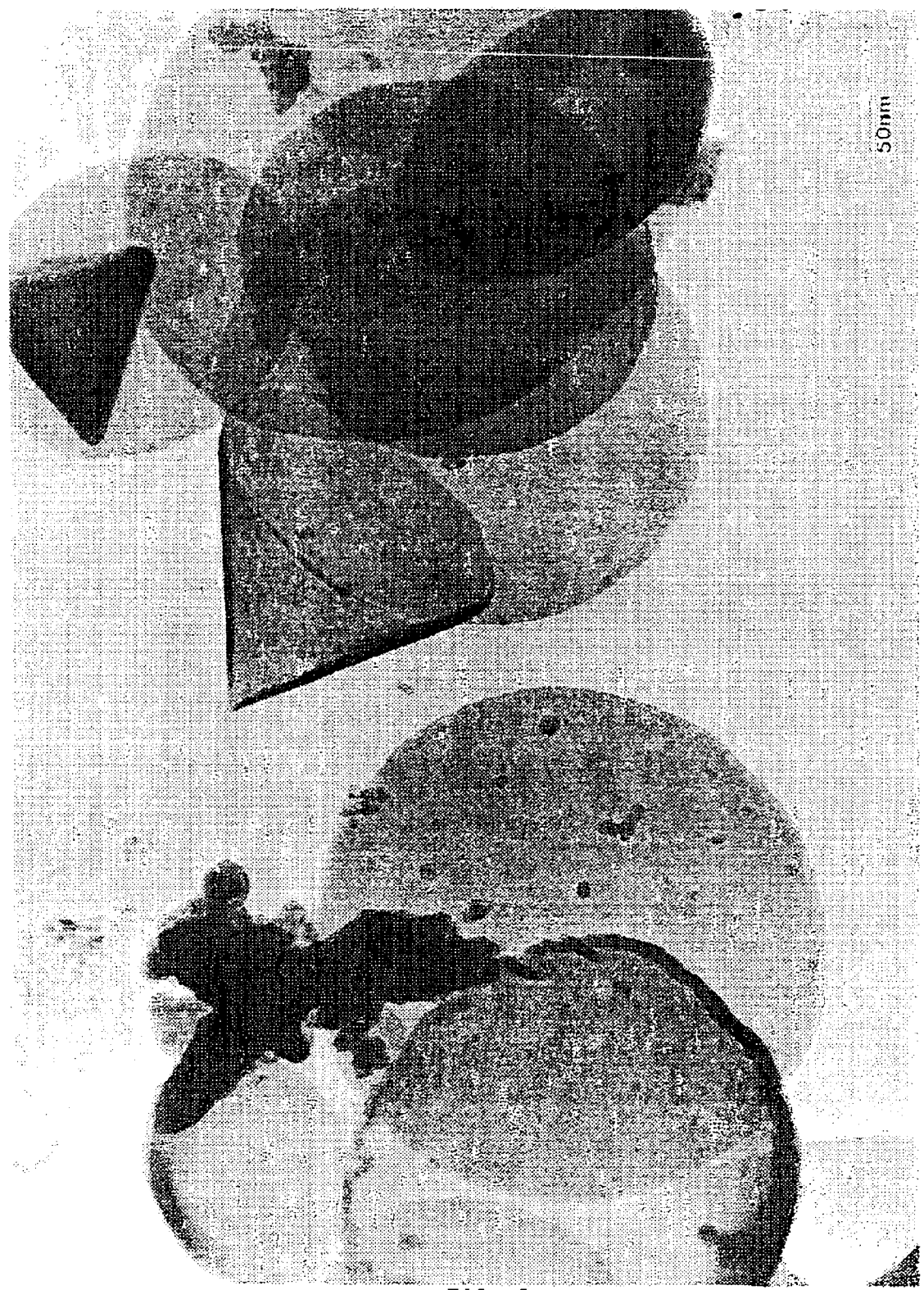
FIG. 2 shows a transmission electron microscope photograph of the samples revealing the various types of open micro-conical carbons of the invention.

FIG. 2 shows a typical example of the content of the micro-domain material. Each piece in the sample forms a single graphitic domain and the alignment of the sheets in each domain is typically turbostratic, as determined from electron microscopy. The diameter of the domains is typically less than 5 micrometers and the thickness less than 100 nanometers.

In the following, it will be demonstrated that by altering the conditions in the plasma reactor, it is possible to produce either conventional carbon black or micro-domain graphitic materials. According to the present invention, both may be used as a hydrogen storage media. In Example 1, the process parameters are chosen in such a way that conventional carbon black is formed at the first (and only) cycle of hydrocarbons through the reactor. By varying the feedstock feed rate, the plasma gas enthalpy and the residence time, it is shown in Example 2 that at the second cycle through the reactor, micro-domain graphitic materials can be produced from PAHs formed in the first cycle.

EXAMPLE 1

Heavy fuel oil was heated to 160° C. and introduced in the reactor by use of the self-invented axial aligned nozzle at a feed rate of 67 kg per hour. The reactor pressure was kept at 2 bar. Hydrogen was employed as plasma gas, and the plasma gas feed rate was 350Nm$^3$/h, while the gross power supply from the plasma generator was 620 kW. This resulted in a plasma gas enthalpy of 1.8 kWh/Nm3 $H_2$. The time elapsed from the atomised oil was introduced until the product left the reactor was approximately 0.23 seconds.

The resulting carbon black was traditional amorphous of N-7xx quality. The volatile content of the carbon black was measured to 0.6%.

EXAMPLE 2

In this example the oil feed rate, the hydrogen plasma gas enthalpy as well as the residence time was tuned in such a direction that the evaporated hydrocarbons did not achieve pyrolysis temperature during the first cycle. The residence time of the hydrocarbons during the first cycle through the reactor was minimised by increasing the oil and plasma gas feed rate.

Heavy fuel oil was heated to 160° C. and introduced in the reactor by use of the self-invented axial aligned nozzle at a feed rate of 115 kg per hour. The reactor pressure was kept at 2 bar. The hydrogen plasma gas feed rate was 450 Nm$^3$/h, while the gross power of supply from the plasma generator was 1005 kW. This resulted in plasma gas enthalpy of 2.2 kWh/Nm$^3$ $H_2$. The time elapsed from the oil was introduced until the PAHs left the reactor was approximately 0.16 seconds.

The resulting PAHs were reintroduced into the reactor in the plasma-arc zone to produce a micro-domain graphitic material, with a yield higher than 90%. The volatile content of the carbon material was measured to 0.7%. All other process parameters were the same as for the first cycle.

Although in the example of the production of the hydrogen storage media has been described as a conversion of heavy oil to a micro-domain graphitic material, it should be understood that the media can be produced from conversion of all hydrocarbons, both liquid and gaseous. Also, the production may be performed as a batch or continuous production, with one or more plasma reactors in series etc. Concerning micro-domain graphitic products where the PAHs formed in the first decomposition step is reintroduced into the same plasma reactor, the micro-domain graphitic materials formed in the second decomposition step are of course separated from the PAH containing plasma gas by any conventional suited means. This may be by filtering, cyclones etc.

Further, any gas that is inert and do not pollute the micro-domain products may be used as plasma gas, but hydrogen is specially suited since it is a product of the process. The plasma gas may be recycled back into the reactor, if desired. It is also possible to employ the present method by introducing additional hydrocarbons through inlets at the sides of the decomposition reactor to control the temperature in the decomposition zone and/or to increase the yield, see the applicant's European patent EP 0 636 162.

References

1. D. Huffman, Physics Today, p. 22, 1991.
2. T. W. Ebbesen, Physics Today, p. 26, 1996.
3. M. Ge and K. Sattler, Chemical Physics Letters 220, p. 192, 1994.
4. P. Li and K. Sattler, Mat. Res. Soc. Symp. Proc. 359, p. 87, 1995.
5. R. Vincent, N. Burton, P. M. Lister and J. D. Wright, Inst. Phys, Conf. Ser., 138, p. 83, 1993.
6. Hydrogen & Fuel Cell Letter, vol. 7/No. 2, Feb. 1997.
7. R. M. Baum, Chem. Eng. News, 22, p. 8,1993.
8. Japanese Patent JP 27801 A2, Fullerene-based hydrogen storage media, 18$^{th}$ August 1994.
9. A. Hirsch, Chemistry of Fullerenes, Thieme Ferlag, Stuttgart, Ch. 5, p. 117, 1994.
10. B. P. Tarasov, V. N. Fokin, A. P. Moravsky, Y. M. Shul'ga, V. A. Yartys, Journal of Alloys ans Compounds 153–254, p. 25, 1997.
11. R. E Haufler, Y. Chai, L. P. F.m, Chibante, J. Conceico, C. Jin, L-S Wang, S. Maruyama, R. E. Smalley, Mat. Res. Soc. Symp. Proc. 206, p. 627, 1991
12. M. Endo and H. W. Kroto, J. Phys. Chem. 96, p. 6941, 1992.

What is claimed is:

1. A carbon media for storage of hydrogen comprising micro-domain graphitic materials consisting of at least one of materials selected from the group consisting of carbon nanotubes, fullerenes, carbon micro-cones and flat graphitic carbon sheets, wherein said media includes micro-domain graphitic materials that have a graphitic stacking direction and a domain size and which have been produced by decomposition of hydrocarbons in a reaction chamber connected to a plasma generator in which the hydrocarbons are subjected to a first decomposition step and said plasma generator includes a plasma arc zone, where the hydrocarbons are fed into the decomposition chamber in the vicinity of the plasma arc zone and mixed with the plasma arc, and where the plasma arc zone is operated with adjustable process parameters and the process parameters are adjusted in such a manner that the hydrocarbons do not reach pyrolysis temperature and are only partially decomposed to form polycyclic aromatic hydrocarbons (PAHs), -that the hydrocarbons in the form of PAHs are, after the first decomposition step, mixed with a plasma arc and reintroduced as a part of a plasma gas into a plasma arc zone in a decomposition chamber and subjected to a second decomposition step, where the heat in the plasma arc zone causes the PAHs to be converted into the micro-domain graphitic materials, that the domain size is smaller than 5 $\mu$m in diameter or length parallel to a graphitic stacking direction and having a thickness of less than 100 nm in the graphitic stacking direction.

2. A media according to claim 1, wherein the media contains micro-domain graphitic materials in the range from 0 to above 90 wt %.

3. A media according to claim 2, wherein the media contains more than 90 wt % micro-domain graphitic materials.

4. A media according to any one of claim 1, wherein the media results from dehydrogenation of heavy fuel oil into micro-domain graphitic materials.

5. A carbon media for storage of hydrogen comprising micro-domain graphitic materials, wherein said media contains open carbon micro-cones with total disclination degrees of at least 60° and/or 120°, corresponding to cone angles of respectively at least 112.9° and/or 83.6°.

* * * * *